United States Patent [19]
Lindell

[11] Patent Number: 4,949,497
[45] Date of Patent: Aug. 21, 1990

[54] ICE FISHING DEVICE

[76] Inventor: James R. Lindell, 27125 Beverly Dr., Excelsior, Minn. 55331

[21] Appl. No.: 149,969

[22] Filed: Feb. 3, 1988

Related U.S. Application Data

[63] Continuation of Ser. No. 860,843, May 8, 1986, abandoned.

[51] Int. Cl.$^5$ .............................................. A01K 97/12
[52] U.S. Cl. ...................................... 43/17; 242/224; 43/21.2
[58] Field of Search .................. 43/17, 21.2, 16, 20, 43/17.5, 18.1; 242/84.11; 248/213.2, 538

[56] References Cited

U.S. PATENT DOCUMENTS

| | | | |
|---|---|---|---|
| 685,185 | 10/1901 | Smith | 43/17 |
| 827,972 | 8/1906 | Grignon | 43/17 |
| 1,777,496 | 10/1930 | Killory | 43/17 |
| 2,018,468 | 10/1935 | Pflueger | 242/81.1 R |
| 2,283,430 | 5/1942 | Frettem | 43/17.5 |
| 3,165,278 | 1/1965 | Wade | 242/84.1 J |
| 3,354,573 | 11/1967 | Johansson | 43/21.2 |
| 3,571,964 | 3/1971 | Bogathy | 43/21.2 |
| 3,659,369 | 5/1972 | Hermanson | 43/21.2 |
| 4,014,127 | 3/1977 | Turner | 43/20 |
| 4,016,670 | 4/1977 | Pihlaja | 43/17 |
| 4,124,174 | 11/1978 | Kelly | 242/84.5 A |
| 4,360,172 | 11/1982 | Cope | 242/106 |
| 4,571,876 | 2/1986 | LeClair | 43/17 |

FOREIGN PATENT DOCUMENTS

| | | | |
|---|---|---|---|
| 3219504 | 5/1983 | Fed. Rep. of Germany | 43/17 |
| 389542 | 3/1933 | United Kingdom | 43/16 |

OTHER PUBLICATIONS

Bass Pro Shop, 1986.

Primary Examiner—Kurt Rowan
Attorney, Agent, or Firm—Merchant, Gould, Smith, Edell, Welter & Schmidt

[57] ABSTRACT

The shaft consists of zinc plated steel. A rubber clamp consisting of an O-ring is placed on the shaft by using finger pressure. A nylon washer is then placed on the shaft. The nylon spool with cut-glass beads therein is then placed on the shaft, followed by a nylon washer and a rubber O-ring clamp. A rubber end cap is then placed over the end of the shaft. To enable the device to have the weight distributed to the bottom of a 5-gallon pail for more stability, the shaft is longer at the bottom and is bent at a 130-degree angle and needs only to be placed into a 5-gallon pail for support. The sleeve mounted device has a shorter shaft and is bent at a 90-degree angle. A nylon sleeve is held in a vertical position by a two-hole clamp. The shaft of the device fits into the nylon sleeve and provides ease of swiveling the device from side to side. The device may be removed from the sleeve by lifting the shaft out of the sleeve.

5 Claims, 2 Drawing Sheets

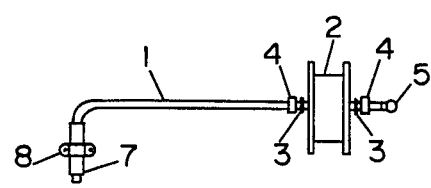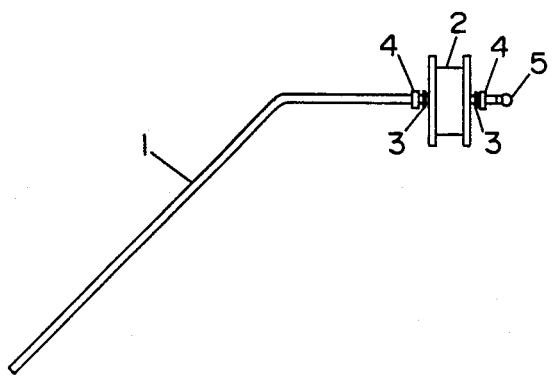
FIG. 1  FIG. 2
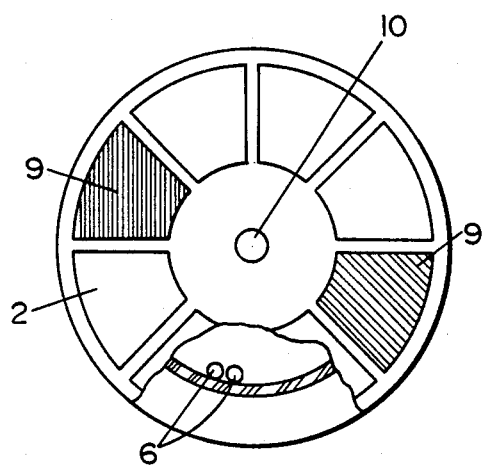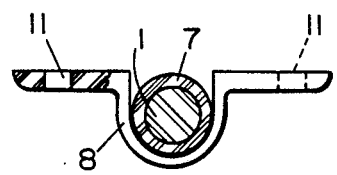
FIG. 3  FIG. 4

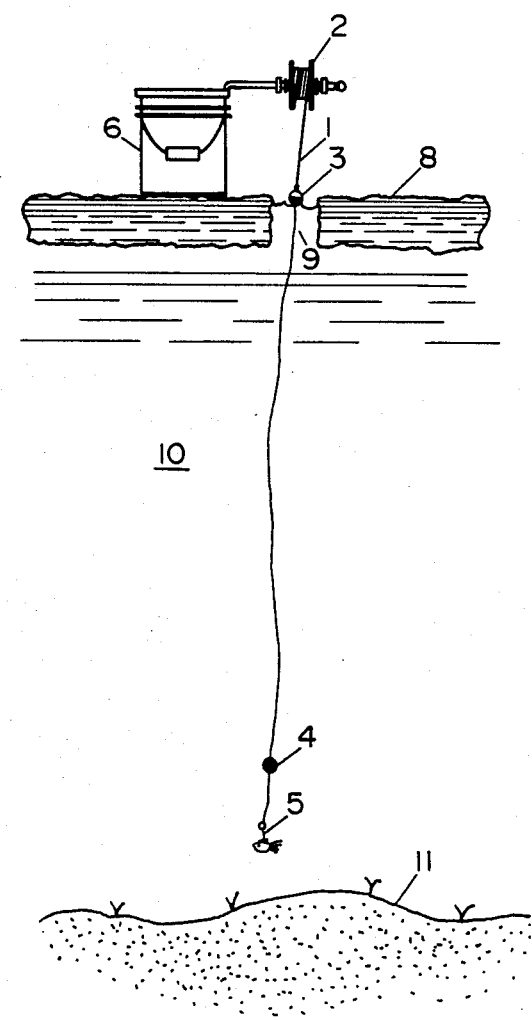
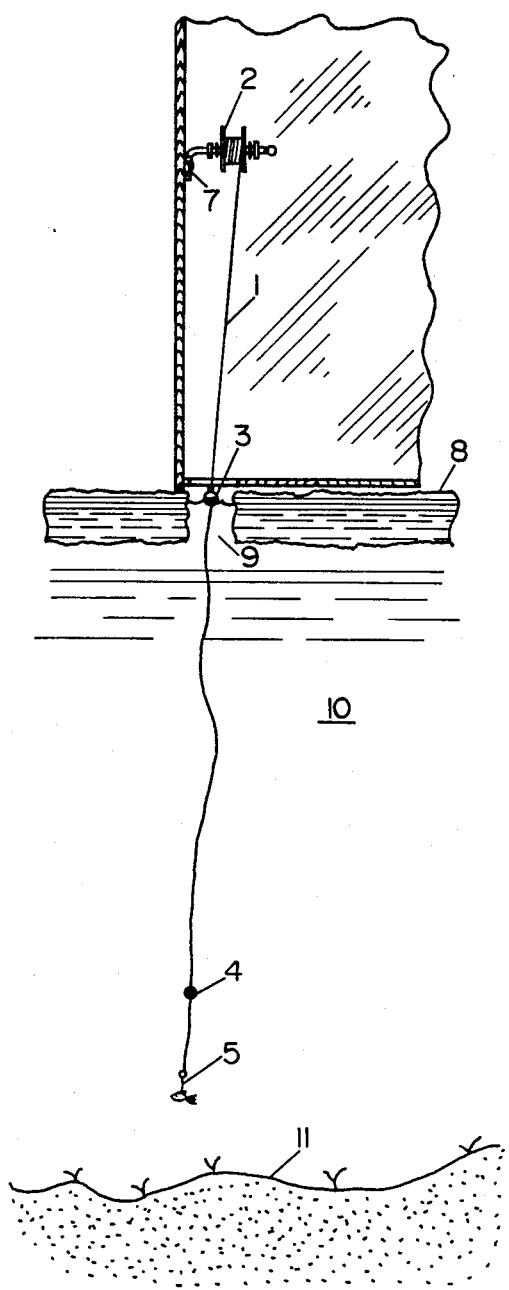
FIG. 5
FIG. 6

ICE FISHING DEVICE

This is a continuation, of application Ser. No. 860,843, filed May 8, 1986 now abandoned.

BACKGROUND OF THE INVENTION

This invention relates to successful angling of fish through an opening in the ice by using a new device which is extremely portable. If a fish feels resistance before it is hooked, you usually lose the fish. This device has a spool that holds line and operates so smoothly that fish do not feel resistance. A person also must be alerted of a fish biting. Another object of this invention is to alert the person by both sight and sound. The device furnishes these advantages by using noise-making beads inside the spool and by having a colorcoded spool. Another object of this invention is to provide a person an ice fishing device that is portable and may be used inside and outside a fish house. The device may be simply (1) placed into a 5-gallon pail to be used anywhere on the ice, and (2) placed into a sleeve mount which enables the device to be removed easily by lifting and to be placed into another sleeve mount in a fish house without using any tools. Because ice freezes from the outside of the opening in the ice to the center, it is important that the fish line is centered in the opening in the ice. Therefore, an object of this invention is to provide the person with a spool on a shaft that can be adjusted easily by using finger pressure rather than by using tools to make the adjustment. Another object of this invention is to provide a person a means to remove or swivel the device out of the way to enable an opening in the ice to be cut with an auger. This device provides the advantages of both removing and swiveling it out of the way without using any tools.

To my knowledge, there is no other ice fishing device that provides (1) smoothness of operation, (2) both sight and sound features to alert a person of a fish bite, (3) an ice fishing device that can be used both inside and outside a fish house with a great degree of portability, (4) a spool that slides easily on the shaft over the center of the hole in the ice without having to use any tools, and (5) a means to remove or swivel the device out of the way so that an opening may be cut in the ice with an ice auger.

SUMMARY OF THE INVENTION

It is an object of this invention to provide a person a means to be more successful in angling for fish through an opening in the ice.

Toward this end, the ice fishing device was developed with a rust-resistant steel shaft that is shaped to be placed into a 5-gallon pail and a shaft that is shaped to be placed into a special sleeve mount. These features make the device extremely portable as the device may be placed into or lifted out without the use of any tools. The device may be moved anywhere on the ice and may be placed into any other sleeve mounts in a fish house. The spool is made of nylon and turns smoothly on the steel shaft. There are two nylon washers between each side of the spool and two rubber clamps outside the washers. This allows the spool to turn easily and to be adjusted easily over the center of the hole in the ice by merely pushing against the rubber clamps with your fingers. There is a rubber end cap at the end of the shaft for safety and also to place your hook when it is not in use. The spool has two different reflective color-coded strips that are located on the face of the spool that alert a person. The person can see the color spin when a fish is biting. There are also cut-glass beads inside the spool that make a rattling sound when a fish bites. Thereby the person is alerted by both sight and sound. The device may be used inside or outside a fish house and has a spool that turns so easily that fish will not feel resistance.

These and other objects and advantages of the invention will become readily apparent as description is read in conjunction with the accompanying drawings wherein like reference numerals are used to refer to the several view.

DESCRIPTION OF THE DRAWINGS OF THE PREFERRED EMBODIMENTS OF THE INVENTION

FIG. 1 is a side view showing all the parts of the device when it is used in a 5-gallon pail.

FIG. 2 is a side view showing all the parts of the device when it is used in a sleeve mount placed on a vertical structure.

FIG. 3 is a cut-out frontal view of the spool which would face the person, and it illustrates the color-coded sections, the small cut-glass beads, and the opening in the center of the spool.

FIG. 4 is a cut-out top view of the shaft, sleeve, and clamp; and it illustrates the shaft held in place with a two-hole clamp and a sleeve.

DESCRIPTION OF THE DRAWINGS FOR GENERAL OPERATION

FIG. 5 is a side view of the device in operation after it has been placed into a 5-gallon pail on the ice.

FIG. 6 is a side view of the device after it has been placed into a sleeve mount on a wall in a fish house.

DESCRIPTION OF THE PREFERRED EMBODIMENTS OF THE INVENTION

Referring now to the drawings (FIGS. 1, 2, 3, and 4), shaft 1, spool 2, nylon washers 3, rubber clamps 4, rubber end cap 5, cut-glass beads 6, sleeve 7, and two-hole clamp 8 constitute the invention.

Referring now to FIGS. 1 and 2, a nylon spool 2 is mounted on a rust-resistant steel shaft 1. There are two nylon washers 3 that are located next to the nylon spool 2 and two rubber clamps 4 next to the nylon washers 3. A rubber end cap 5 is located at the upper end of shaft 1.

Referring now to FIG. 1, the shaft 1 is bent at a 130-degree angle to enable it to be placed into a 5-gallon pail.

Referring to FIG. 2, the shaft 1 is bent at a 90-degree angle to enable it to be placed into a sleeve 7 with said sleeve 7 held firmly with a two-hole clamp 8.

Referring to FIG. 3, two strips of different color 9 are on the outer face of spool 2. Spool 2 has eight divisions and has an opening in the center 10 of the spool 2. There are two cut-glass beads 6 inside spool 2.

Now referring to FIG. 4, the clamp 8 has two openings in the ends 11 of clamp 8 that enable clamp 8 to be secured to a vertical structure by the use of screws and bolts. Sleeve 7 has the opening in the center with the space occupied by shaft 1, thus enabling shaft 1 to be inserted, swiveled from side to side, and removed.

OPERATION OF THE INVENTION

Referring to the General Operation Drawings, FIG. 5 illustrates the device shaped to be placed in a 5-gallon pail 6, and FIG. 6 illustrates the device shaped to be placed in a sleeve mount 7.

The person places fish line 1 on the spool 2 and attaches a hook 5. A small weight 4 is placed about 24 inches above the hook 5. The person would then attach a heavy clamp weight on the hook 5 and lower it into the water 10 to find the bottom 11. When there is no slack in the line 1, the person has the hook 5 resting at the bottom. The line 1 is raised the desired distance from the bottom 11, and a float 3 is then placed on the line 1 to keep a baited hook 5 at the desired depth.

The invention may be placed in a five-gallon pail 6 with the outer spool 2 facing the person. The line 1 should not have any slack between the spool 2 and the float 3.

The person is now free of any operation and may do other things. When a fish bites, the spool 2 turns; and the person can see the color-coded spool 2 turning and possibly hear the noise caused by cut-glass beads inside spool 2.

When alerted of a fish bite, the person rotates the spool 2 downward to give slack line 1 and moves the device out of the way. The person then grasps the slack line 1 in such a way to not let the fish feel any resistance. When the line 1 is almost tight, the person jerks upward on the line 1 to set hook 5 into the fish and pulls the line 1 upward until the fish appears in the opening in the ice 9. While the fish is still in the water 10 and the line 1 is held tight, the person grasps the fish with the other free hand and lands the fish. Loose line 1 is placed on the ice 8 as the fish is being landed. The fish is then freed of the hook 5 and may be placed in the five-gallon pail 6. The person then rebaits the hook 5 and places the hook 5 and weight 4 in the opening in ice 9 and allows the line 1 to sink until the float 3 stops the line 1, hook 5, and weight 4. The person then rotates the spool 2 upward to take up the slack line 1 between the float 3 and the spool 2. The ice fishing device is now ready to alert a person of another fish bite.

The ice fishing device provides a means: (a) to use a device that is portable, (b) to store line and alert a person by both sight and sound when a fish is biting and a spool that turns so easily that fish do not feel resistance, (c) to slide the spool on the shaft so it is centered easily over the opening in the ice without using any tools to make the adjustment, and (d) to remove and swivel the device out of the way to enable an opening in the ice to be cut with an ice auger.

The present ice fishing device provides a means: (a) to be simply placed into a 5-gallon pail, (b) to be simply removed by lifting the device from the pail, (c) to be simply inserted into a sleeve mount, and (d) to be simply removed by lifting the device from the sleeve.

This ice fishing device further comprises: (a) a spool that will produce the least amount of resistance when spinning on the shaft, (b) a shaft that is bent in such a manner that it can be simply placed into a 5-gallon pail, (c) a shaft that is bent in such a manner that it can be simply inserted into a sleeve mount, (d) washers that provide the least amount of friction against a spinning spool, (e) clamps that may be adjusted without using tools, (f) an end cap that will enable a person to secure a hook therein.

The ice fishing device further comprises: (a) a shaft that is bent at a 130-degree angle to facilitate placement into a 5-gallon pail, and (b) a shaft that is bent at a 90-degree angle to facilitate placement into a sleeve mount.

The ice fishing device comprises: (a) a shaft, (b) a spool, (c) washers, (d) clamps, (e) and an end cap.

The ice fishing device further comprises: (a) a sleeve and (b) a clamp to hold the sleeve firmly in place.

The ice fishing device further comprises: (a) a white nylon spool with a color-coded face containing noise-making beads therein, (b) a bright-colored rust-resistant steel shaft, (c) two white nylon plastic washers, (d) two black rubber O-ring clamps, (e) one black rubber end cap, (f) a white nylon sleeve, and (g) a white nylon two-hole wall clamp.

I claim:

1. An ice fishing device suitable for mounting on the vertical wall of an ice fishing house, said device comprising a wall bracket, a support rod and a rotatable spool, said spool having an opening defined therein, said support rod being L-shaped having an elongated portion and an integral short portion, said short portion being in parallel with said vertical wall, said short portion being removeably mounted in said wall bracket, said elongated portion being received in the opening defined in said spool, said support rod including a cylindrical portion and said spool having an opening defined in the center thereof approximating the diameter of said cylindrical portion, and a pair of elastic O-rings snugly disposed on said cylindrical portion whereby the location of said spool may be adjusted by movement of the location of said O-rings on said cylindrical portion.

2. The ice fishing device of claim 1 wherein said device includes a pair of nylon washers, one of said washers being disposed between each of said O-rings and said spool.

3. The ice fishing device of claim 1 wherein said spool includes an internal chamber and a plurality of beads in said chamber, wherein said beads produce noise when said spool is rotated.

4. An ice fishing device comprising a rod-like support, a spool rotatably disposed on said support, wherein said rod-like support comprises a rod having a first elongated portion for disposition in a five gallon pail and a second portion disposed at an angle about 130° to such first portion, said second portion being disposed at an angle of about 130° to such first portion, said second portion serving to rotatably support said spool, said spool having color-coded sections whereby one may observe rotation of said spool at a distance from said device, said device including means for adjustably positioning said spool at various locations along said support.

5. The ice fishing device of claim 4 wherein said positioning means comprise a washer and an O-ring disposed at each side of said spool and mounted on said rod.

* * * * *